(12) United States Patent
Jost et al.

(10) Patent No.: US 9,616,364 B2
(45) Date of Patent: Apr. 11, 2017

(54) FILTERING DEVICE FOR FLUIDS

(75) Inventors: Ernst Jost, Pucking (AT); Josef Arbeithuber, Linz (AT); Manfred Hackl, Linz-Urfahr (AT); Klaus Feichtinger, Linz (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 935 days.

(21) Appl. No.: 13/807,280

(22) PCT Filed: Jun. 30, 2011

(86) PCT No.: PCT/AT2011/000288
§ 371 (c)(1),
(2), (4) Date: Jul. 5, 2013

(87) PCT Pub. No.: WO2012/003520
PCT Pub. Date: Jan. 12, 2012

(65) Prior Publication Data
US 2013/0270170 A1    Oct. 17, 2013

(30) Foreign Application Priority Data
Jul. 5, 2010    (AT) ................. A 1133/2010

(51) Int. Cl.
*B29C 47/68*    (2006.01)
*B01D 29/66*    (2006.01)
(Continued)

(52) U.S. Cl.
CPC .......... *B01D 29/66* (2013.01); *B29C 47/0815* (2013.01); *B29C 47/0877* (2013.01);
(Continued)

(58) Field of Classification Search
CPC ............ B29C 47/0815; B29C 47/0886; B29C 47/0877; B29C 47/0009; B29C 47/0818;
(Continued)

(56) References Cited

U.S. PATENT DOCUMENTS 5,417,856 A * 5/1995 Bacher ................... B01D 29/05
                                                                   210/108
6,117,338 A    9/2000 Hoagland et al.

FOREIGN PATENT DOCUMENTS

DE    2 407 663 A    9/1974
DE    266 535 A1    4/1989
(Continued)

OTHER PUBLICATIONS

International Search Report mailed on Oct. 13, 2011 for PCT Patent Application No. PCT/AT2011/000288, 3 pages.
(Continued)

*Primary Examiner* — Madeline Gonzalez
(74) *Attorney, Agent, or Firm* — Kilpatrick Townsend & Stockton LLP

(57) ABSTRACT

The present invention relates to a filtering device for fluids, in particular thermoplastics, comprising a screen carrier (2) which has a rotationally cylindrical outer face (41) and is mounted rotatably in a rotationally cylindrical recess (5), adapted to its circumference, of a stationary housing (3) and in which a number of screening nests (6) having filter arrangements (7) are formed along its circumference. According to the invention, there is provision whereby the screen carrier (2) is penetrated by a rotationally cylindrical core part (1) and is mounted rotatably on this, the core part (1) and the housing (3) being designed to be stationary and fixed in terms of rotation with respect to the rotatable screen carrier (2).

15 Claims, 4 Drawing Sheets

(51) Int. Cl.
*B29C 47/00* (2006.01)
*B29C 47/08* (2006.01)

(52) U.S. Cl.
CPC ........ *B29C 47/0886* (2013.01); *B29C 47/683* (2013.01); *B29C 47/0009* (2013.01); *B29C 47/081* (2013.01); *B29C 47/0818* (2013.01); *B29C 47/68* (2013.01); *B29C 47/686* (2013.01)

(58) Field of Classification Search
CPC ... B29C 47/686; B29C 47/683; B29C 47/081; B29C 47/68; B01D 29/66
USPC ......... 210/324–330, 350, 340, 338; 425/185, 425/199
See application file for complete search history.

(56) References Cited

FOREIGN PATENT DOCUMENTS

| | | |
|---|---|---|
| DE | 42 12 928 A1 | 10/1993 |
| DE | 101 51 496 A1 | 12/2002 |
| EP | 0 072 149 A1 | 2/1983 |
| EP | 0554237 A1 | 8/1993 |
| EP | 1 053 854 A1 | 11/2000 |
| WO | 2004/002715 A1 | 1/2004 |
| WO | 2005/072932 A1 | 8/2005 |

OTHER PUBLICATIONS

Austrian Search Report, dated Dec. 17, 2010, for corresponding Austrian Application No. A 1133/2010, 1 pages.

* cited by examiner

Section: A-A
D-D

Section: C-C
(illustrated as rotated 45°)

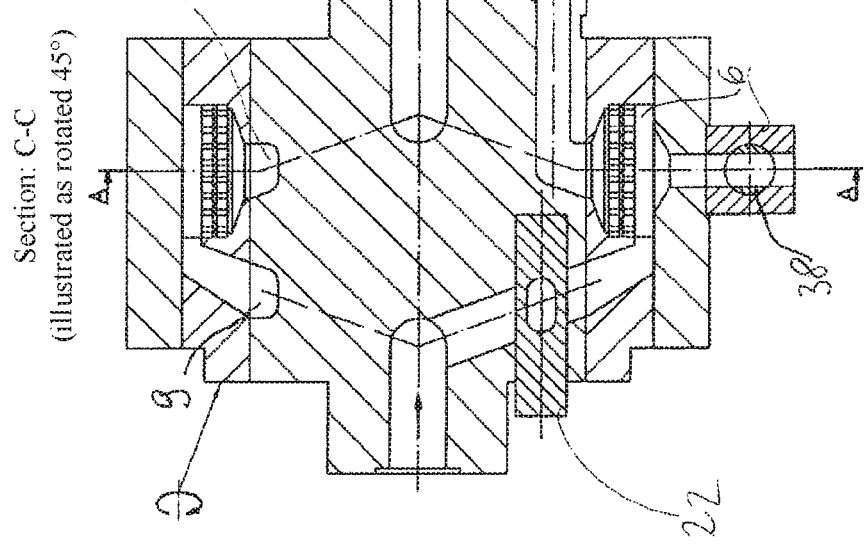

FILTERING DEVICE FOR FLUIDS

CROSS REFERENCES TO RELATED APPLICATIONS

This application is a U.S. National Phase under 35 USC 371 of PCT Application No. PCT/AT2011/000288 filed Jun. 30, 2011, which claims priority to the Austrian Application No. A 1133/2010, filed Jul. 5, 2010, the disclosures of which are incorporated by reference herein.

FIELD OF THE INVENTION

The invention relates to a filtering device for fluids, in particular thermoplastics, according to the precharacterizing clause of Patent Claim 1.

BACKGROUND

The filtering devices for thermoplastics which are in the molten state and, in particular, originate from recycled plastic waste are known. The plastic melt is in this case conducted via filter arrangements in order to filter out impurities. Filtering devices of this type possess a number of screening nests in which filter arrangements lie. These filter arrangements have to be backwashed from time to time and, if they are blocked, have to be exchanged, in order to achieve satisfactory filtration and a satisfactory passage of the plastic melt.

BRIEF SUMMARY OF THE INVENTION

The aim of the invention is to produce a filtering device which is constructed in a structurally simple way and can be operated or controlled easily and which ensures, along with an appropriately high throughput of plastic melt, effective backwashing of the filter arrangements and a rapid exchange of the filter arrangements.

In a filtering device of the type mentioned in the introduction, these aims are achieved by means of the features listed in the characterizing clause of Claim 1.

Mounting the screen carrier on a stationary core part affords a stable base for the filtering device. Since, furthermore, the housing is designed so as to be fixed in position and so as to be fixed in terms of rotation, the only rotating component present is the rotatable screen carrier in which only the screening nests and short conduit parts are to be formed. The essential conduits and recesses are formed around or on the outer face of the core part, so that set-up and maintenance and the operability of the filtering device control are simplified. Consequently, the screen carrier can receive a large number of screening nests, so that the fluid throughput can be increased. The control of the screen carrier is simple, since, by the screen carrier being rotated about the core part, each of the screening nests can be adjusted into a filter arrangement exchange position or into a backwashing position, without appreciable operational interruptions or an appreciable interruption in the throughput of plastic melt being necessary as a result. Moreover, the throughflow pass through the screening nests are short and the heat losses are low, since the inflow and outflow of the plastic melt to be purified take place inside the core part and the housing ensures corresponding outward insulation.

It is advantageous if an inflow duct for the fluid to be filtered and an outflow duct for the filtered fluid are worked out or cut out in the surface of the core part and extend, in planes in each case parallel to one another and running perpendicularly with respect to the axis of rotation of the core part, at least over a circumferential portion, if appropriate the entire circumference, of the core part.

A specific circumferential portion is made available for each screen carrier performing its function and for the filter removal station and the backwashing station. If, furthermore, there is provision whereby screening nests lining the screen carrier in a plane running perpendicularly with respect to the axis of rotation of the screen carrier and also the mouths of the supply conduit and discharge conduits of the screening nests are formed at uniform intervals along the circumference of the screen carrier, this results in a substantially regular or symmetrical set-up of the screen carrier which can consequently be manufactured and controlled in a simple way.

For feeding the screening nests, it is advantageous if a supply conduit and a discharge conduit for the fluid are formed in the screen carrier for the respective screening nests, the mouth of the supply conduits lying on the inner face of the screen carrier in the plane of the inflow duct and the mouth of the discharge conduit lying on the inner face of the screen carrier in the plane of the outflow duct, so that the supply conduit is connectable in a fluid-conducting manner to the inflow duct and the discharge conduit to the outflow duct. A simple set-up arises if the supply conduit is led in the screen carrier to a radially outer region of the screening nest or of the filter arrangement, so that the fluid can flow through the filter arrangement radially from the outside inwards.

For the throughflow of the filter arrangements and for exchanging these, it is advantageous if the screening nests are formed in each case by a recess which is located in the screen carrier and which opens onto the outer face of the screen carrier, the filter arrangements being inserted into the recess from the outer face, and the supply conduit issuing laterally into the free space or region located between the filter arrangement and the outer face, and the discharge conduit emanating from that region of the recess which lies radially on the inside with respect to the filter arrangement, in the direction of the core part.

A simple set-up of the supply conduit and discharge conduit for the plastic melt is obtained when the inflow duct is connected via at least one connecting conduit to a feed conduit and the outflow duct is connected via at least one connecting conduit to a collecting conduit, if appropriate the feed conduit and the collecting conduit being incorporated or introduced centrically into the core part from opposite end faces of the core part.

A simple set-up of a station on the housing circumference for the exchange of filter arrangements is achieved when a removal orifice, closable by means of a lid, for removing a filter arrangement located in a screening nest is formed in at least one circumferential portion of the housing, and an outlet conduit capable of being shut off by means of a valve in formed in at least one further circumferential portion (U2) of the housing (3).

A functionally and structurally simple set-up of a station for the backwash or exchange of a screening nest is achieved when circumferential portions of the core part which lie opposite the removal orifice and/or the outlet conduit and/or the mouth of the supply conduit and of the discharge conduit are free of portions of the inflow duct and/or outflow duct, or when, in a circumferential portion of the core part, the said circumferential portion being free of portions of the inflow duct and/or outflow duct, a delivery conduit, branched off from the feed conduit, is led to the surface of the core part and can be shut off or released by means of a first valve and the mouth of which lies in the plane of the inflow duct and can therefore be connected to the supply conduit, and when, in the core part, a washing conduit emanating from the collecting conduit and capable of being shut off or released by means of a second valve is led to the surface of the core part, the mouth of the washing conduit lying in the plane of the outflow duct and therefore being connectable to the discharge conduit of the screening nest.

In order to achieve a defined and effective backwash, there is provision whereby a branch conduit is connected to the washing conduit between its mouth and the second valve and is led to a suction/pressure pump, preferably a reciprocating piston pump, the working space of the pump being connected to a reservoir for filtered fluid, the said reservoir being connected to the filtrate side or the collecting conduit via the washing conduit and the valve. The pump presses the filtrate sucked in from the reservoir through the filter arrangement. Consequently, if required, multiple backwashing of one and the same screening nest can be carried out and blockages of different intensity can be taken into account by the choice of the pressure profile, in particular the head, of the pump pressure. The filtrate may be used for washing, for example, with a rising pressure or starting from a high initial pressure with a falling pressure or in the form of shockwaves or may be pressed through the filter arrangement.

A structurally simple set-up is obtained when the screening nests lying in the screen carrier in a plane running perpendicularly with respect to the axis of rotation of the screen carrier and also the mouths of their supply conduits and discharge conduits are formed at uniform intervals along the circumference of the screen carrier, and/or when the mouths of the supply conduits and of the discharge conduits lie in each case on a generatrix of the inner face of the screen carrier and the interval between them along this generatrix corresponds to the interval between the inflow duct and the outflow duct along a generatrix of the core part.

An escape of plastic melt is avoided if there is provision whereby the screen carrier is mounted, fluid-tight, on the core part and in the housing. By an exact seat or exact mutual fit of the screen carrier, core part and housing being formed, sealing measures can be minimized.

It is simple for production and in terms of the set-up if the branch conduit to the suction/pressure pump and the second valve are located in a portion of the core part which projects out of the housing and out of the screen body.

DESCRIPTION OF THE DRAWINGS

The invention is explained in more detail below, by way of example, with reference to the drawing.

FIGS. 3, 4, 5 and 6 show in each case mutually associated longitudinal sections and cross sections of filtering devices according to the invention for the purpose of explaining the backwashing of screening nests.

DETAILED DESCRIPTION

Figure 1:
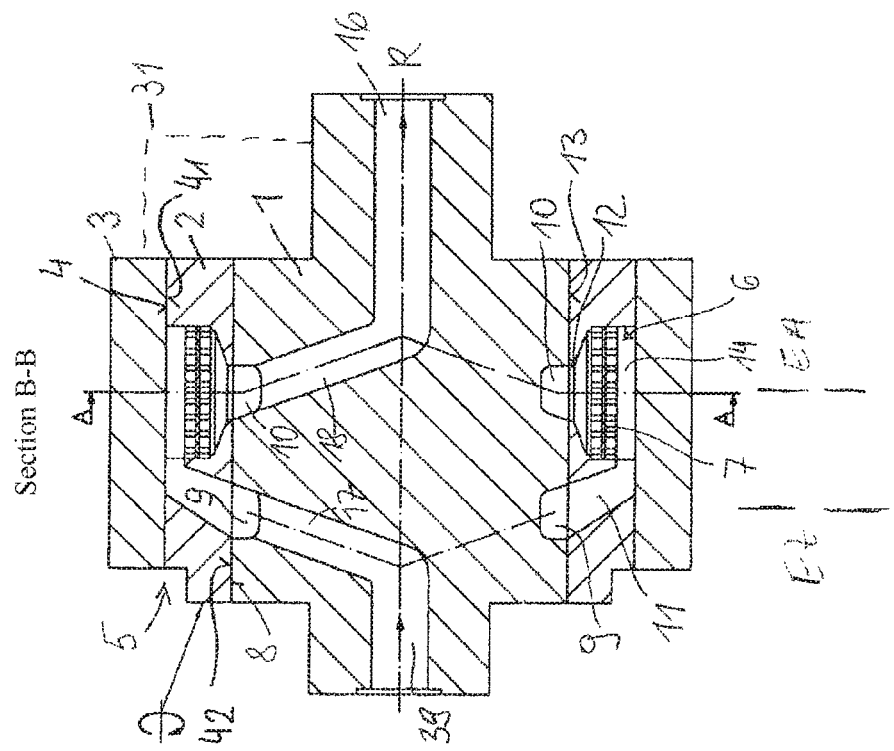
Figure 4:
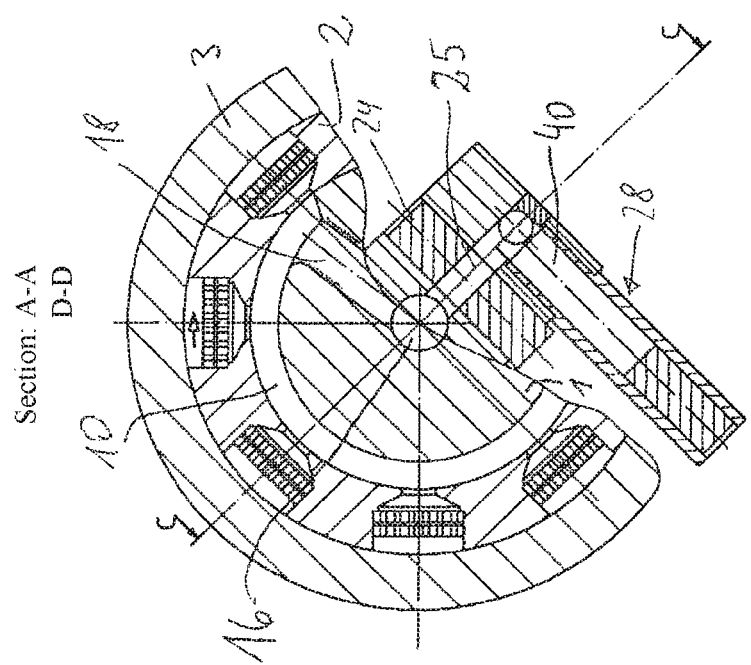

FIG. 1 shows a diagrammatic longitudinal section through a filtering device according to the invention. Filtering devices of this type are used, in particular, for the filtration of plastic melts which are employed for the reprocessing of recycled plastic waste. Such plastic waste contains many foreign substances which have to be separated out before the granulation or direct further processing of the plastic melt.

A filtering device according to the invention comprises a core part 1 which is mounted at a fixed location and fixedly in terms of rotation on a stand 31 merely indicated. A screen carrier 2 is directly mounted rotatably on this core part 1 of rotationally cylindrical configuration and is in the form of a rotationally cylindrical ring. The screen carrier 2 is surrounded directly by a housing 3 which possesses a rotationally cylindrical inner face 4. The housing 3 is likewise mounted at a fixed location and fixedly in terms of rotation in the stand 31. Thus, as indicated by 31, the housing 3 and the core part 1 are designed to be stationary in static terms and the screen carrier 2 is rotatable in relation to the housing 3 and to the core part 1. The screen carrier 2 is mounted or guided sealingly in the recess 5 of the housing 3. The inner face 42 of the screen carrier 2 is also sealed with respect to the circumferential face 8 of the core part 1. Sealing may also take place by means of sealing rings. An escape of plastic melt out of the ducts or the transitions from the core part 1 to the screen carrier 2 or out of the gap between the screen carrier 2 and housing 3 is thereby avoided.

A number of screening nests 6 are formed in the screen carrier 2. As is clear from FIG. 2, in this embodiment eight screening nests 6 are arranged in the screen carrier 2 and are in each case arranged at equal angular intervals with respect to the axis of rotation R of the screen carrier 2. The screen carrier 2 may be configured symmetrically with respect to the screening nests 6 and to the filter arrangement 7 located in these screening nests.

A feed conduit 39 for the delivery of plastic melts to be filtered is cut out in the core part 1 and is led via a connecting conduit 17 to an inflow duct 9 which extends annularly at least over a portion A of the circumference of the core part 1 in the surface 8 of the core part 1.

In the opposite end face lies the mouth of a collecting conduit 16 which is connected via a connecting conduit 18 to an outflow duct 10 which extends parallel to the inflow duct 9 at least over a portion A of the circumference of the core part 1 in the surface 8 of the core part 1. The inflow duct 9 lies in a plane EZ which runs perpendicularly with respect to the axis of rotation R of the screen carrier 2. The outflow duct 10 lies in a plane EA which likewise runs perpendicularly with respect to the axis of rotation R of the screen carrier 2.

Figure 2:
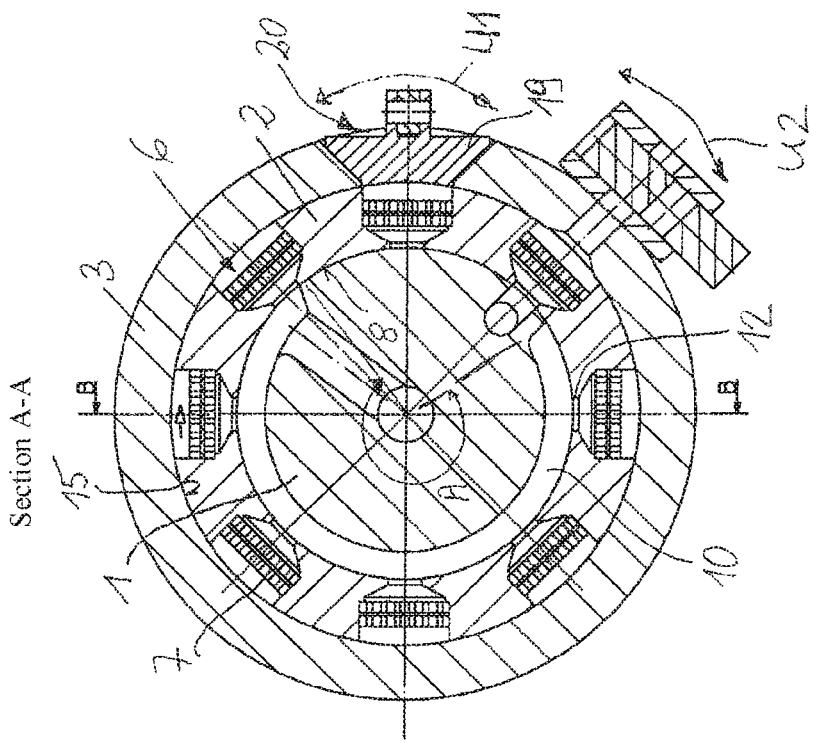
FIGS. 1 and 2 show mutually associated sections through a filtering arrangement according to the invention.

It can be seen from FIG. 2 that the inflow duct 9 for fluid to be filtered and the outflow duct 10 for filtered fluid are worked out or cut out in the surface 8 of the core part 1 and can extend, in planes EZ, EA in each case parallel to one another and running perpendicularly with respect to the axis of rotation of the core part 1, over a circumferential portion or even over the entire circumference of the core part 1.

In a special embodiment of the invention, there may be provision whereby, if at least three screening nests 6 are formed, the inflow duct 9 and the outflow duct 10 extend over a central angle range A of the circumferential face 8 of the core part 1 to which the following applies:

$$\frac{360(n-2)}{n} > A > \frac{360(n-3)}{n},$$

n corresponding to the number of screening nests 6 present.

In the screen carrier 2, a supply conduit 11 is formed by a recess in the screen carrier 2 for a predetermined number, preferably for each, of the screening nests and is led from the inner wall face 13 of the screen carrier 2 to a radially outer region 14 of the recess in the screen carrier 2, a filter arrangement 7 being mounted in the said recess. A discharge conduit 12 emanates from this recess in the direction of the core part 1 or the outflow duct 10. The supply conduit 11 and the discharge conduit 12 are at an interval on the generatrix of the inner wall face of the screen carrier 2 which corresponds to the interval between the supply conduit plane EZ and the discharge conduit plane EA. All the intervals are measured from the mid-planes or mid-points on the corresponding ducts or their mouths.

It can thus be seen from FIGS. 1 and 2 that melt delivered via the feed conduit 15 enters the inflow duct 9 and is distributed there over the circumferential portion A of the inflow duct 9. The plastic melt enters the respective supply conduits 11 of the screening nests 6 from this inflow duct 9 and penetrates through the filter arrangement 7 from the outer region 14 in the radial direction to the core part 1 and via the discharge conduit 12 enters the outflow duct 10 which is connected to the collecting conduit 16 via the connecting conduit 18. It is basically also possible to reverse the direction of flow, but in this case a higher outlay in structural terms will be necessary for backwashing.

It can be seen, furthermore, from FIG. 2 that eight screening nests 6 lying in a plane running perpendicularly with respect to the axis of rotation R of the screen carrier 2 are formed in the screen carrier 2. In the present embodiment, seven of these eight screening nests 6 are available for purifying the plastic melt. In the case illustrated, there is no provision for filtering the melt in the station or for changing the filter arrangement.

One of the screening nests 6, when the filter device is in operation, is in the position or in a circumferential portion in which a screen change, that is to say an exchange of the filter arrangement 7, can be carried out. This circumferential portion of the housing 3 or of the screen carrier 2 or the core part 1 is designated by U1. A further circumferential portion U2 of the housing 3, of the screen carrier 2 or of the core part 1 is likewise configured specially, and in this position backwashing of a screen nest 6 or of the filter arrangement 7 located in it is possible. If no backwashing takes place in this station, the screening nest 6 located in this position can be used for filtering the plastic melt. For the possibility of also being able to carry out purification of the fluid in the backwashing station, conduits 21, 25 capable of being shut off by means of valves 22, 24 are provided. Basically, even a plurality of stations for screen changes or for backwashing may be formed along the circumference of the screen ring 2.

Figure 7:
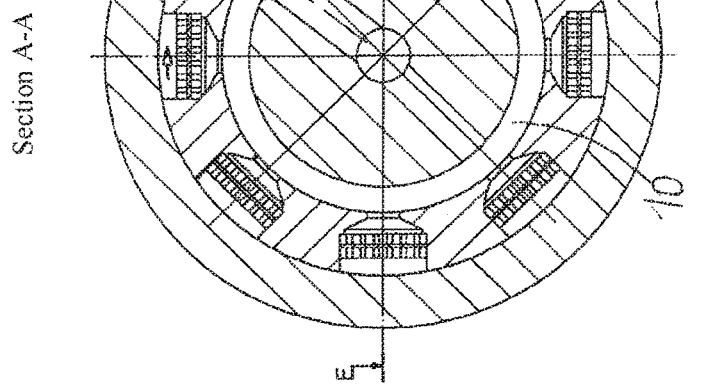
FIGS. 7 and 8 show a longitudinal section and a cross section of a filtering device according to the invention in the removal position of the screen carrier for the purpose of explaining the exchange of filter arrangements.

FIG. 7 illustrates a longitudinal section through a screening nest 6 which is located in the circumferential portion U1, in which position it is possible for the filter arrangement 7 to be exchanged. A recess 32, through which access to the screening nest 6 is possible, is formed in the housing 3. This recess can be closed by means of a lid 33, which lid 33 can be adjusted or brought into the closing position via a closing lever mechanism or lever 34.

Figure 8:
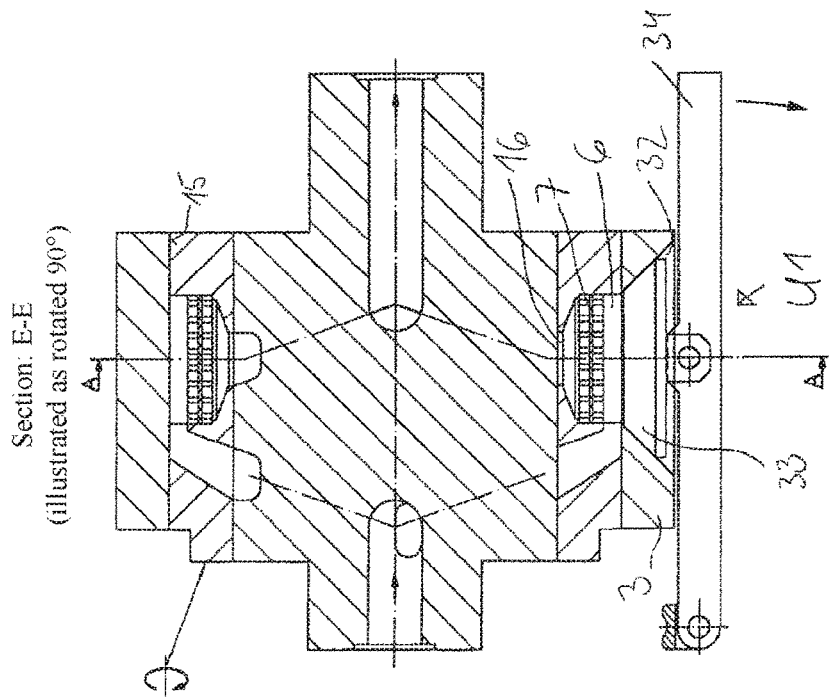

It can be seen in FIG. 8 that the filter arrangement 7 is formed by a filter carrier 35 and a filter 36 carried by the latter, which can both be inserted into the screening nest 6.

It is advantageous if the circumferential portion U1 of the core part 2 which lies opposite the removal orifice 20 and the mouth of the supply conduit 11 and discharge conduit 12 is free of portions of the inflow duct 9 and/or outflow duct 10. Measures are therefore taken to ensure that plastic melt cannot escape when the filter arrangement 7 is being changed or the filter 36 is being changed or that the screening nest 6 is pressureless during the exchange. This could basically also be achieved in that shut-off valves or shut-off slides are inserted in the conduits 11, 25.

Figure 3:
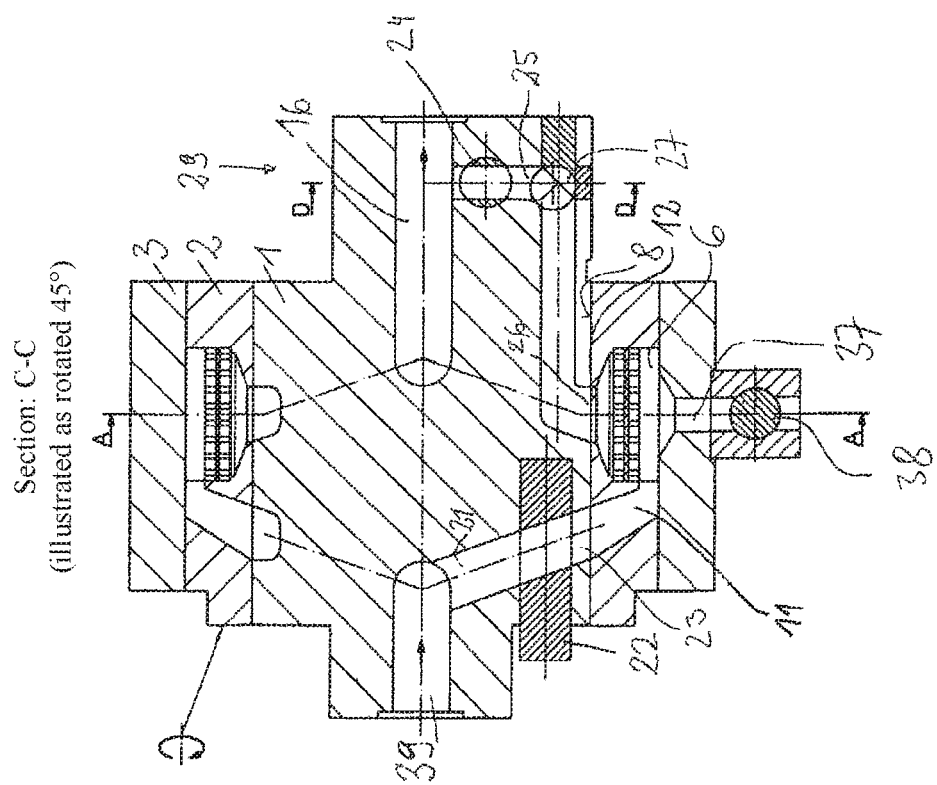

FIG. 3 illustrates in more detail the circumferential portion U2 with the backwashing station. In this circumferential portion U2, the housing 3 possesses an outlet conduit 37 which can be shut off by means of a valve 38 and which issues into the radially outer region 14 of the screening nest 6. The delivery conduit 21 emanates from the feed conduit 39 and can be released or shut off by means of a first valve 22. This delivery conduit 21 issues in the supply conduit plane EZ on the surface 8 of the core part 1 and guides the plastic melt into the supply conduit 11 of the screening nest 6. From the collecting conduit 16, a washing conduit 25 branches off, in which lies a second valve 24 by means of which the washing conduit 25 can be separated from or connected to the collecting conduit 16. The washing conduit 25 is led in the core part 1 as far as its mouth 26 in the surface 8 of the core part 1. The mouth 26 lies in the discharge conduit plane EA and matches with the discharge conduit 12.

Connected to the washing conduit 25 is a conduit 27 which is led to a melt reservoir 30. This melt reservoir 30 can be filled with purified or filtered plastic melt via the washing conduit 25 when the second valve 24 is open. Connected to this melt reservoir 30 is a pump 28, preferably a pressure or suction piston pump, by means of which, with the second valve 24 closed, the plastic melt can be pressed through the washing conduit 25 and its mouth 26 from the radially inner side of the filter arrangement 7 through this filter arrangement 7. In this case, as illustrated in FIG. 5 the first valve 22 is closed and the third valve 38 is in the open position. The plastic melt conveyed by means of the pump 28 can consequently flow through the filter arrangement 7 opposite to the filter direction otherwise provided and can discharge the impurities at the same time detached from the filter arrangement 7 out of the screen nest 6 through the outlet conduit 37.

If the first valve 22 is in the open position, the second valve 24 in the open position and the third valve 38 in the shut-off position, plastic melt to be filtered flows via the conduit 21, the filter arrangement 7 and the branch conduit 25 into the collecting conduit 16, so that each screening nest 6 located in the circumferential portion U2 can filter plastic melt to be treated.

There may be provision whereby, in the circumferential portion U2 of the core part 2, the said circumferential portion U2 being free of portions of the inflow duct 9 and/or outflow duct 10, a delivery conduit 21 branched off from the feed conduit 39 is led to the surface 8 of the core part 1 and can be shut off or released by means of a first valve 22 and the mouth 23 of which lies in the plane EZ of the inflow duct 9 and can therefore be connected to the supply conduit 11. In the core part 1, a washing conduit 25 emanating from the discharge conduit 16 and capable of being shut off or released by means of a second valve 24 is led to the surface 8 of the core part 1, the mouth 26 of the washing conduit 25 lying in the plane EA of the outflow duct 10 and therefore being connectable to the discharge conduit 12.

As may be gathered from FIG. 3, it is structurally expedient if the branch conduit 27 to the suction/pressure pump 28 and the second valve 24 are located in a portion 29 of the core part 1 which projects out of the housing 3 and out of the screen body 2.

FIG. 3 illustrates the bottom screening nest in the filtering position. FIG. 5 illustrates this screening nest during its backwashing. The valves 22, 24 and 38 are positioned correspondingly. Normally, the screening nests 6 remain or the screen carrier 2 remains in one and the same position in the housing 1 as long as a backwash of a screening nest 6 or an exchange of a filter arrangement 7 is not required. There may perfectly well be provision whereby the filter arrangements 7 are exchanged at regular time intervals or whereby the individual filter arrangements 7 are backwashed in series. Rotation of the screen carrier 2 advantageously takes place only as required and through an angle such that the supply conduits 11 and discharge conduits 12 of the individual screening nests match with the corresponding ducts 9, 10 and their mouths in the core part 1 in respect of annular positions of the screening nest 6.

It is expedient if the mouths of the supply conduit 11 and of the discharge conduit 12 lie along a generatrix of the inner surface area 42 of the screen carrier 2. There may perfectly well also be provision whereby the mouths of the supply conduit 11 and of the discharge conduit 12 or screening nests 6 are offset with respect to one another in the circumferential direction of the screen carrier 2. It is necessary merely to ensure that, in any working position of a screening nest 6, there is a possibility of a corresponding overflow from the inflow duct 9 into the screening nest 6 or from the latter into the outflow duct 10. It is essential, however, to have exact positioning of the screen carrier 2 or of the screening nest 6 in the event that backwashing of a filter arrangement 7 or its exchange is to be carried out.

The invention claimed is:

1. A filtering device for fluids, in particular thermoplastics, comprising a screen carrier which has a rotationally cylindrical outer face and is mounted rotatably in a rotationally cylindrical recess, adapted to its circumference, of a stationary housing and in which a number of screening nests having filter arrangements are formed along its circumference, whereby the screen carrier is penetrated by a rotationally cylindrical core part and is mounted rotatably on the core part, the core part and the housing being designed to be stationary and fixed in terms of rotation with respect to the rotatable screen carrier, characterized in that, an inflow duct for fluid to be filtered and an outflow duct for filtered fluid are worked out or cut out in a surface of the core part and extend, in planes in each case parallel to one another and running perpendicularly with respect to the axis of rotation of the core part, at least over a circumferential portion of the core part, and in that a supply conduit and a discharge conduit for the fluid for the respective screening nests are formed in the screen carrier, a mouth of the supply conduit lying on an inner face of the screen carrier in the plane of the inflow duct, and the mouth of the discharge conduit lying on the inner face of the screen carrier in the plane of the outflow duct, so that the supply conduit is connectable in a fluid-conducting manner to the inflow duct and the discharge conduit to the outflow duct.

2. The filtering device according to claim 1, characterized in that the supply conduit and the discharge conduit are defined by a surface of the inner wall of the recess.

3. The filtering device according to claim 1, characterized in that the supply conduit is led in the screen carrier to a radially outer region of the screening nests or of the filter arrangement, so that the fluid can flow through the filter arrangement radially from the outside inwards.

4. The filtering device according to claim 1, characterized in that the individual screening nests are formed by a recess which is located in the screen carrier and which opens onto an outer face of the screen carrier, the filter arrangements being inserted into the recess from the outer face, and the supply conduit issuing laterally into a free space or region located between the filter arrangement and the outer face, and the discharge conduit emanating from that region of the recess which lies radially on the inside with respect to the filter arrangement, in the direction of the core part.

5. The filtering device according to claim 1, characterized in that the inflow duct is connected via at least one connecting conduit to a feed conduit and the outflow duct is connected via at least one connecting conduit to a collecting conduit, the feed conduit and the collecting conduit advantageously being incorporated or introduced centrically into the core part from opposite end faces of the core part.

6. The filtering device according to claim 1, characterized in that a removal orifice, closeable by means of a lid, for removing a filter arrangement located in a screening nest is formed in at least one circumferential portion of the housing, and an outlet conduit capable of being shut off by means of a valve is formed in at least one circumferential portion of the housing.

7. The filtering device according to claim 6, characterized in that circumferential portions of the core part which lie opposite the removal orifice, the outlet conduit, the mouth of the supply conduit and of the discharge conduit are free of portions of the inflow duct and outflow duct, or in a circumferential portion of the core part, said circumferential portion being free of portions of the inflow duct and outflow duct, a delivery conduit, branched off from the feed conduit, is led to the surface of the core part and can be shut off or released by means of a first valve and a mouth of which lies in the plane of the inflow duct and can therefore be connected to the supply conduit, and in that, in the core part, a washing conduit emanating from a collecting conduit and capable of being shut off or released by means of a second valve is led to the surface of the core part, a mouth of the washing conduit lying in the plane of the outflow duct and therefore being connectable to the discharge conduit of the screen carrier.

8. The filtering device according to claim 7, characterized in that a branch conduit is connected to the washing conduit between its mouth and the second valve and is led to a suction/pressure pump, preferably a reciprocating piston pump, the working space of the pump being connected to a melt reservoir for filtered fluid, said melt reservoir being connected to the collecting conduit via the washing conduit and the valve.

9. The filtering device according to claim 8, characterized in that the branch conduit to the suction/pressure pump and the second valve are located in a portion of the core part which projects out of the housing and out of the screen body.

10. The filtering device according to claim 1, characterized in that the screen carrier is mounted, fluid-tight, on the core part and in the housing.

11. The filtering device according to claim 1, characterized in that the screening nests are lying in a plane running perpendicularly with respect to the axis of rotation of the screen carrier and also the mouths of their supply conduits and discharge conduits are formed at uniform intervals along the circumference of the screen carrier.

12. The filtering device according to claim 1, characterized in that the mouths of the supply conduits and of the discharge conduits lie in each case on a generatrics of the inner face of the screen carrier, and the interval between them along this generatrix corresponds to the interval between the inflow duct and the outflow duct along a generatrix of the core part.

13. The filtering device according to claim 1, characterized in that the housing is in the form of a rotationally cylindrical ring.

14. The filtering device according to claim 1, characterized in that the circumferential portion of the core part and of the housing for the exchange of the filter arrangements and the circumferential portion of the core part and of the housing for backwashing the filter arrangements are located next to one another on the circumference of the core part or of the housing.

15. The filtering device according to claim 1, characterized in that the inflow duct and the outflow duct extend over a central angle range of the circumferential face of the core part, to which the following applies:

$$\frac{360(n-2)}{n} > A > \frac{360(n-3)}{n},$$

n corresponding to the number of screening nests present.

* * * * *